(12) United States Patent
Engel et al.

(10) Patent No.: US 7,154,496 B1
(45) Date of Patent: Dec. 26, 2006

(54) TELEMETRY-BASED FLIGHT VEHICLE VISUALIZATION SYSTEM AND METHOD

(75) Inventors: Paul B. Engel, Littleton, CO (US); Rodney E. Mack, Centennial, CO (US); Jon E. Tattershall, Littleton, CO (US); Timothy L. Williams, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 132 days.

(21) Appl. No.: 10/284,069

(22) Filed: Oct. 30, 2002

Related U.S. Application Data

(60) Provisional application No. 60/338,552, filed on Oct. 30, 2001.

(51) Int. Cl.
*G06T 15/00* (2006.01)
(52) U.S. Cl. ............................. 345/419; 345/418; 701/1
(58) Field of Classification Search ................ 345/619, 345/440, 440.1; 340/945, 947, 951, 953, 340/948, 961, 957; 244/164; 701/201, 226; 342/357.02
See application file for complete search history.

(56) References Cited

U.S. PATENT DOCUMENTS

| | | | | |
|---|---|---|---|---|
| 5,574,648 A | * | 11/1996 | Pilley | 701/120 |
| 6,148,179 A | * | 11/2000 | Wright et al. | 455/66.1 |
| 6,314,366 B1 | * | 11/2001 | Farmakis et al. | 701/201 |
| 6,338,011 B1 | * | 1/2002 | Furst et al. | 701/1 |
| 6,512,527 B1 | * | 1/2003 | Barber et al. | 345/764 |

* cited by examiner

*Primary Examiner*—Ulka Chauhan
*Assistant Examiner*—Daniel F. Hajnik
(74) *Attorney, Agent, or Firm*—Marsh Fischmann & Breyfogle LLP

(57) ABSTRACT

A flight vehicle image generation computer system is disclosed that displays preferably a 3D image of a flight vehicle and preferably on at least generally a real-time basis. The system stores data profiles in relation to any number of types or classes of flight vehicles. The system retrieves the data profile associated with the flight vehicle to be imaged, and invokes a request for telemetry data on the flight vehicle from a telemetry data processor in accordance with this data profile. The system allows for switching between telemetry data processors associated with the system during imaging of a flight vehicle, and allows the image of the flight vehicle to be displayed at multiple locations.

32 Claims, 6 Drawing Sheets

TELEMETRY-BASED FLIGHT VEHICLE VISUALIZATION SYSTEM AND METHOD

CROSS-REFERENCE TO RELATED APPLICATIONS

This patent application claims priority from U.S. Provisional Patent Application Ser. No. 60/338,552, filed on Oct. 30, 2001, and entitled "REAL TIME 3D VISUALIZATION FOR LAUNCH VEHICLE AND SPACECRAFT OPERATIONS FROM TELEMETRY," the entire disclosure of which is incorporated by reference in its entirety herein.

STATEMENTS REGARDING FEDERALLY SPONSORED RESEARCH OR DEVELOPMENT

Not applicable.

FIELD OF THE INVENTION

The present invention generally relates to flight vehicles (e.g., launch vehicles, spacecraft, aircraft) and, more particularly, to a system and method for generating a visual image of the operation of flight vehicles.

BACKGROUND OF THE INVENTION

Real-time analysis and display of incoming launch vehicle and spacecraft telemetry data historically has been limited to textual/numeric displays and simple 2D plots and graphs. Any 3D visualization of flight events was accomplished much later by animation artists depicting an approximation of a given flight event. Vehicle engineers, management, and customers must rely on these abstract numerical and 2D clues during flight to mentally visualize the status of the mission. As more and more factors are included (e.g., rapidly changing vehicle states; earth rotation and revolution around the sun; angles to ground stations and other spacecraft; complicated definitions of attitude and position factors), it becomes extremely difficult to conceptualize the mission.

Various types of flight vehicles exist, such as launch vehicles (that which is utilized in the initial launch from Earth and to transport its payload a certain distance above the Earth's surface), spacecraft (e.g., satellites), and aircraft. There are of course also multiple configurations within each of these general categories of flight vehicles. Limiting any flight vehicle visualization system to a particular flight vehicle configuration would thereby not allow such a system to be utilized for other flight vehicle configurations.

At least in the case of launch vehicles and spacecraft, telemetry data is transmitted from the flight vehicle back to Earth for various purposes. Telemetry data from the flight vehicle may be transmitted to what may be characterized as a TLM processor (e.g., Loral System 90 (TPE), Loral 510, Loral 550, Nighthawk, PowerHawk, Braxton TPS, Defense Systems TPSR (Telemetry Processor System Revised) and TPS2 (Telemetry Processing System 2)). Limiting any flight vehicle visualization system to a particular TLM processor makes any such flight vehicle visualization system reliant/susceptible to the data stream from this single TLM processor. For instance, the data stream from a given TLM processor may include "bad" data, which could then affect the performance of any flight vehicle visualization system receiving data therefrom. Moreover, loss of a communication link between a given TLM processor and any flight vehicle visualization system, as well as this TLM processor ceasing operation, would of course impede the ability for the flight vehicle visualization system to generate an accurate/updated image of the flight vehicle.

BRIEF SUMMARY OF THE INVENTION

The present invention generally relates to generating an image of a flight vehicle from telemetry data and may be in the form of a method or a system that includes the functionality to be described herein. Typically the present invention will be used to assist in the visualization of the behavior of the flight vehicle during operation, its position relative to Earth and other extraterrestrial bodies, other satellites, ground stations, ground vehicles, and aircraft. The present invention is not directed to obtaining "actual video footage" of the flight vehicle during operation. Instead, telemetry data on the flight vehicle is used by a flight vehicle image generation system in accordance with the present invention to manipulate an image of a flight vehicle on an appropriate display(s) to provide valuable feedback to the viewer(s). The actual image that is generated and manipulated may be an electronic image of a flight vehicle, such as in the form of a CAD file that is stored on a computer-readable storage medium, although preferably this electronic image of a flight vehicle is of the same type or class as the flight vehicle that is providing the telemetry data.

A first aspect of the present invention generally relates to generating an image of a flight vehicle. A request is made regarding the type or class of the particular flight vehicle for which image generation by a flight vehicle image generation computer system in accordance with the first aspect is desired. Information regarding the type or class of the flight vehicle is entered or input to the flight vehicle image generation computer system. Telemetry data from an actual flight vehicle is ultimately provided to the flight vehicle image generation computer system in accordance with the type or class of flight vehicle that was input to the system. An image of a flight vehicle is generated on the flight vehicle image generation computer system using this telemetry data.

Various refinements exist of the features noted in relation to the first aspect of the present invention. Further features may also be incorporated in the first aspect of the present invention as well. These refinements and additional features may exist individually or in any combination. The flight vehicle image generation computer system associated with the first aspect may be used to generate images of multiple types or classes of flight vehicles (e.g., launch vehicles, satellites, aircraft, ground vehicles). Any type or class of flight vehicle may be stored on the flight vehicle image generation computer system and in any appropriate manner. For instance, each type or class of flight vehicle may be stored in a database on a computer-readable storage medium in a manner so as to allow a particular type or class of flight vehicle to be retrieved (e.g., using an appropriate identifier, a textual description, or both). The flight vehicle image generation computer system may be configured so that a data profile is stored on the system in relation to each type or class of flight vehicle for which an image may be generated using this system. Once the relevant data profile has been retrieved, telemetry data on the actual flight vehicle may be received by the flight vehicle image generation computer system in accordance with this data profile for generation of an image of a flight vehicle in accordance with the first aspect.

A graphical user interface may be utilized for requesting/inputting information in any appropriate manner regarding the type or class of flight vehicle for which image generation by the flight vehicle image generation computer system in accordance with the first aspect is desired. In one embodiment, a list of those vehicle types or classes that are available for generation of an image in accordance with the first aspect are displayed for review and selection (e.g., by an operator of the flight vehicle image generation computer system; in the form of a drop-down menu or the like on a graphical user interface). However, any appropriate way may be utilized by the first aspect for prompting the identification of the type or class of flight vehicle for which image generation by the flight vehicle image generation computer system in accordance with the first aspect is desired, of inputting or entering the desired/required information as to the type or class of flight vehicle for which image generation by the flight vehicle image generation computer system in accordance with the first aspect is desired, or both.

There are also a number of characterizations regarding the provision of the telemetry data on the actual flight vehicle to the flight vehicle image generation computer system in accordance with the first aspect. The flight vehicle image generation computer system may request the identity of the telemetry data source or processor that will be used to provide telemetry data on the actual flight vehicle to allow generation of an image of a flight vehicle in accordance with the first aspect. Information regarding the identity of the desired telemetry data source or processor may be entered or input to the flight vehicle image generation computer system. A graphical user interface may be utilized for requesting/inputting information in any appropriate manner regarding the identify of the telemetry data source or processor to provide telemetry data on the actual flight vehicle for image generation by the flight vehicle image generation computer system in accordance with the first aspect. In one embodiment, a list of those telemetry data sources that are available for providing telemetry data on the actual flight vehicle for generation of an image of a flight vehicle in accordance with the first aspect are displayed for review and selection (e.g., by an operator of the flight vehicle image generation computer system; in the form of a drop-down menu or the like on a graphical user interface). However, any appropriate way may be utilized by the first aspect for prompting the identification of the telemetry data source or processor to be used to provide telemetry data on the actual flight vehicle for which image generation by the flight vehicle image generation computer system in accordance with the first aspect is desired, of inputting or entering the desired/required information as to the telemetry data source or processor to be used to provide telemetry data on a flight vehicle for which image generation by the flight vehicle image generation computer system in accordance with the first aspect is desired, or both.

In one embodiment, the flight vehicle image generation computer system associated with the first aspect invokes or issues a request for telemetry data to a particular telemetry data source or processor. This request may require that the telemetry data be provided in accordance with a data profile that is specific to the type or class of the flight vehicle for which image generation is desired and that is stored in relation to the flight vehicle image generation computer system (e.g., in a database on a computer-readable storage medium, such as in a flight vehicle database). A client/server architecture may be utilized to acquire telemetry data on the actual flight vehicle as well. For instance, a server may be provided for each telemetry data source or processor that may be utilized by the flight vehicle image generation computer system for receiving telemetry data to generate an image of a flight vehicle. Preferably, each server is local to its associated telemetry data source or processor (e.g., located on the "front-end" of such a telemetry data source or processor and at the same physical location). In any case, the flight vehicle image generation computer system may include a client that operatively interfaces with each of these servers. That is, regardless of which telemetry data source or processor is being utilized by the flight vehicle image generation computer system to generate an image of a flight vehicle, the corresponding telemetry data may be directed through a common client associated with the flight vehicle image generation computer system. This client/server architecture allows additional telemetry data sources or processors to be utilized by the flight vehicle image generation computer system simply by "installing" a new server in relation to the new telemetry data source or processor. Telemetry data from this "new" telemetry data source or processor is still then directed through the common client.

The flight vehicle image generation computer system associated with the first aspect may allow telemetry data to be obtained from any of multiple telemetry data sources or processors. This would allow the flight vehicle image generation computer system to switch from a first telemetry data source or processor to a second, different telemetry data source or processor. Any switch of this type could even be done during the generation of an image of a flight vehicle (e.g., "on-the-fly" or while the flight vehicle image generation computer system is in the process of generating an image of a flight vehicle). One reason for allowing the flight vehicle image generation computer system to retrieve telemetry data from any of multiple telemetry data sources or processors is that the communication link may be lost between the flight vehicle image generation computer system and the telemetry data source or processor being relied upon for telemetry data on the actual flight vehicle for image generation in accordance with the first aspect. Another is that the telemetry data source or processor that is providing the telemetry data for the flight vehicle image generation computer system may become unstable, inoperable, or unavailable, all of which would adversely affect the ability to generate an image of a flight vehicle in accordance with the first aspect on the desired basis.

The flight vehicle image generation computer system may also request the identity of the location(s) where or the display(s) on which the image of a flight vehicle is to be generated in accordance with the first aspect. Information regarding the identity of the desired display(s) or image generation location(s) may be entered or input to the flight vehicle image generation computer system. A graphical user interface may be utilized for requesting/inputting information in any appropriate manner regarding the identify of the location(s) where or the display(s) on which the image of a flight vehicle is to be generated in accordance with the first aspect. In one embodiment, a list of those locations or displays that are available for generating an image of a flight vehicle in accordance with the first aspect are displayed for review and selection (e.g., by an operator of the flight vehicle image generation computer system; in the form of a drop-down menu or the like on a graphical user interface). However, any appropriate way may be utilized by the first aspect for prompting the identification of the location(s) where or display(s) on which a flight vehicle image is to be generated, of inputting or entering the desired/required information as to the identify of the location(s) where or display(s) on which a flight vehicle image is to be generated, or both.

The image of the flight vehicle may be generated at one or more locations by the flight vehicle image generation computer system in accordance with the first aspect. That is, the flight vehicle image generation computer system may be configured to generate an image of a flight vehicle at different locations and on multiple displays, including simultaneously at these different locations and on separate displays. Those locations or displays where the image may be generated by the flight vehicle image generation computer system may be identified for selection (e.g., in the form of a drop-down menu on a graphical user interface associated with the flight vehicle image generation computer system). Any way of identifying those locations or displays where the image is to be generated may be utilized in relation to the first aspect, and more generally any way of inputting those locations or displays where the image is to be generated may be utilized in relation to the first aspect. Moreover, any appropriate physical display for generating an image of a flight vehicle may be utilized at each of the various locations that are available to the flight vehicle image generation computer system. Preferably, the image that is generated on any such display is in three-dimensional form and further is generated at least generally on a real-time basis (e.g., no more than about a five (5) second delay or lag from the actual vehicle flight event, or no more than about a three (3) second delay from receipt of valid telemetry).

The flight vehicle image generation computer system associated with the first aspect may also be configured to allow for the input of a configuration or "config" script in relation to the selected vehicle type or class (e.g., through a graphical user interface). The config script may be of the type that configures one or more aspects of the flight vehicle image generation computer system for the selected vehicle type or class. Multiple config scripts for a given vehicle type or class may be stored in relation to the flight vehicle image generation computer system and displayed for selection of the desired config script (e.g., through a drop-down menu on a graphical user interface). Any way of inputting the desired config script may be utilized. Yet another option that may be utilized by the flight vehicle image generation computer system of the first aspect is to allow for the input of a flight epoch in the relation to a particular flight of the flight vehicle. The flight epoch in effect establishes the layout of one or more celestial objects (including all or part of the solar system) to allow the telemetry data on the flight vehicle to be properly interpreted and utilized by the flight vehicle image generation computer system. Any appropriate identifier may be utilized in relation to making this selection (e.g., a time/date specification or other textual description, since the flight epoch is time-dependent). Multiple flight epochs may be made stored in relation to the system and made available for selection of the desired flight epoch (e.g., through a drop-down menu on a graphical user interface).

A second aspect of the present invention generally relates to generating an image of a flight vehicle. A request is made regarding the identity of the telemetry data source or processor for providing telemetry data to a flight vehicle image generation computer system for generation of an image of a flight vehicle. Information regarding the identity of the desired telemetry data source or processor is entered or input to the flight vehicle image generation computer system. Telemetry data on an actual flight vehicle from the selected telemetry data source or processor is provided to the flight vehicle image generation computer system. An image of a flight vehicle is generated on the flight vehicle image generation computer system using this telemetry data.

Various refinements exist of the features noted in relation to the second aspect of the present invention. Further features may also be incorporated in the second aspect of the present invention as well. These refinements and additional features may exist individually or in any combination. A graphical user interface may be utilized for requesting/inputting information in any appropriate manner regarding the identify of the telemetry data source or processor to provide telemetry data on the actual flight vehicle for image generation by the flight vehicle image generation computer system in accordance with the second aspect. In one embodiment, a list of those telemetry data sources that are available for providing telemetry data on the actual flight vehicle for generation of an image of a flight vehicle in accordance with the second aspect are displayed for review and selection (e.g., by an operator of the flight vehicle image generation computer system; in the form of a drop-down menu or the like on a graphical user interface). However, any appropriate way may be utilized by the second aspect for prompting the identification of the telemetry data source or processor for providing telemetry data on the actual flight vehicle for which image generation by the flight vehicle image generation computer system in accordance with the second aspect is desired, of inputting or entering the desired/required information as to the telemetry data source or processor for providing telemetry data on a flight vehicle for which image generation by the flight vehicle image generation computer system in accordance with the second aspect is desired, or both.

The flight vehicle image generation computer system associated with the second aspect may allow telemetry data to be obtained from any of multiple telemetry data sources or processors. This would allow the flight vehicle image generation computer system to switch from a first telemetry data source or processor to a second, different telemetry data source or processor. Any switch of this type could even be done during generation of an image of a flight vehicle (e.g., "on-the-fly" or while the flight vehicle image generation computer system is in the process of generating an image of a flight vehicle). One reason for allowing the flight vehicle image generation computer system to retrieve telemetry data from any of multiple telemetry data sources or processors is that the communication link may be lost between the flight vehicle image generation computer system and the telemetry data source or processor being relied upon for telemetry data on the actual flight vehicle for image generation in accordance with the second aspect. Another is that the telemetry data source or processor that is providing the telemetry data for the flight vehicle image generation computer system may become unstable, inoperable, or unavailable, all of which would adversely affect the ability to generate an image of a flight vehicle in accordance with the second aspect on the desired basis.

There are a number of other characterizations regarding the provision of the telemetry data on the actual flight vehicle to the flight vehicle image generation computer system in accordance with the second aspect. In one embodiment, the flight vehicle image generation computer system invokes or issues a request for telemetry data to a particular telemetry data source or processor. This request may require that the telemetry data be provided in accordance with a data profile that is specific to the type or class of the flight vehicle for which image generation is desired and that is stored in relation to the flight vehicle image generation computer system (e.g., in a database on a computer-readable storage medium, such as in a flight vehicle database). A client/server architecture may be utilized to acquire telemetry data on the flight vehicle as well. For instance, a server may be provided for each telemetry data source or processor that may be utilized by the flight vehicle image generation computer system for receiving telemetry data to generate an image of a flight vehicle. Preferably, each server is local to its associated telemetry data source or processor (e.g., located on the "front-end" of such a telemetry data source or processor and at the same physical location). In any case, the flight vehicle image generation computer system may include a client that operatively interfaces with each of these servers. That is, regardless of which telemetry data source or processor is being utilized by the flight vehicle image generation computer system to generate an image of a flight vehicle, the corresponding telemetry data may be directed through a common client associated with the flight vehicle image generation computer system. This client/server architecture allows additional telemetry data sources or processors to be utilized by the flight vehicle image generation computer system simply by "installing" a new server in relation to the new telemetry data source or processor. Telemetry data from this "new" telemetry data source or processor is still then directed through the common client.

The flight vehicle image generation computer system associated with the second aspect may also request the identity of the location(s) where or the display(s) on which the image of the flight vehicle is to be generated. Information regarding the identity of the desired display(s) or image generation location(s) may be entered or input to the flight vehicle image generation computer system. A graphical user interface may be utilized for requesting/inputting information in any appropriate manner regarding the identify of the location(s) where or the display(s) on which the image is to be generated in accordance with the second aspect. In one embodiment, a list of those locations or displays that are available for generating an image of a flight vehicle in accordance with the second aspect are displayed for review and selection (e.g., by an operator of the flight vehicle image generation computer system; in the form of a drop-down menu or the like on a graphical user interface). However, any appropriate way may be utilized by the second aspect for prompting the identification of the location(s) where or display(s) on which a flight vehicle image is to be generated, of inputting or entering the desired/required information as to the identify of the location(s) where or display(s) on which a flight vehicle image is to be generated, or both.

The image of a flight vehicle may be generated at one or more locations by the flight vehicle image generation computer system in accordance with the second aspect. That is, the flight vehicle image generation computer system may be configured to generate the image of a flight vehicle at different locations and on multiple displays, including simultaneously at these different locations and on separate displays. Those locations or displays where the image may be generated by the flight vehicle image generation computer system may be identified for selection (e.g., in the form of a drop-down menu on a graphical user interface associated with the flight vehicle image generation computer system). Any way of identifying those locations or displays where the image is to be generated may be utilized in relation to the second aspect, and more generally any way of inputting those locations or displays where the image is to be generated may be utilized in relation to the second aspect. Moreover, any appropriate physical display for generating an image of a flight vehicle may be utilized at each of the various locations that are available to the flight vehicle image generation computer system. Preferably, the image that is generated on any such display is in three-dimensional form and further is generated at least generally on a real-time basis (e.g., no more than about a five (5) second delay or lag from the actual vehicle flight event, or no more than about a three (3) second delay from receipt of valid telemetry).

A request may be made regarding the type or class of the particular flight vehicle for which an image is to be generated by the flight vehicle image generation computer system in accordance with the second aspect. Information regarding the vehicle type or class of the flight vehicle may be entered or input to the flight vehicle image generation computer system in response to such a request. The flight vehicle image generation computer system associated with the second aspect may be used to generate images of multiple types or classes of flight vehicles (e.g., launch vehicles, satellites, aircraft, ground vehicles). Any type or class of flight vehicle may be stored on the flight vehicle image generation computer system and in any appropriate manner. For instance, each type or class of flight vehicle may be stored in a database on a computer-readable storage medium in a manner so as to allow a particular type or class of flight vehicle to be retrieved (e.g., using an appropriate identifier, a textual description, or both). The flight vehicle image generation computer system may be configured so that a data profile is stored on the system in relation to each type or class of flight vehicle for which an image may be generated using this system. Once the relevant data profile has been retrieved, telemetry data on the actual flight vehicle may be received by the flight vehicle image generation computer system in accordance with this data profile for generation of an image of a flight vehicle.

A graphical user interface may be utilized for requesting/inputting information in any appropriate manner regarding the type or class of flight vehicle for which image generation by the flight vehicle image generation computer system in accordance with the second aspect is desired. In one embodiment, a list of those vehicle types or classes that are available for generation of an image thereof in accordance with the second aspect are displayed for review and selection (e.g., by an operator of the flight vehicle image generation computer system; in the form of a drop-down menu or the like on a graphical user interface). However, any appropriate way may be utilized by the second aspect for prompting the identification of the type or class of flight vehicle for which image generation by the flight vehicle image generation computer system in accordance with the second aspect is desired, of inputting or entering the desired/required information as to the type or class of flight vehicle for which image generation by the flight vehicle image generation computer system in accordance with the second aspect is desired, or both.

The flight vehicle image generation computer system associated with the second aspect may also be configured to allow for the input of a configuration or "config" script in relation to a selected vehicle type or class in accordance with the foregoing (e.g., through a graphical user interface). The config script may be of the type that configures one or more aspects of the flight vehicle image generation computer system for the selected vehicle type or class. Multiple config scripts for a given vehicle type or class may be stored in relation to the flight vehicle image generation computer system and displayed for selection of the desired config script (e.g., through a drop-down menu on a graphical user interface). Any way of inputting the desired config script may be utilized. Yet another option that may be utilized by the flight vehicle image generation computer system of the second aspect is to allow for the input of a flight epoch in the relation to a particular flight of the flight vehicle. The flight epoch in effect establishes the layout of one or more celestial objects (including all or part of the solar system) to allow the telemetry data on the flight vehicle to be properly interpreted and utilized by the flight vehicle image generation computer system. Any appropriate identifier may be utilized in relation to this selection (e.g., a time/date specification or other textual description, since the flight epoch is time-dependent). Multiple flight epochs may be made stored in relation to the system and made available for selection of the desired flight epoch (e.g., through a drop-down menu on a graphical user interface).

A third aspect of the present invention generally relates to generating an image of a flight vehicle. A request is made regarding the identity of the location(s) where or the display(s) on which the image of a flight vehicle is to be generated. Information regarding the identity of the desired display(s) or image generation location(s) may be entered or input to the flight vehicle image generation computer system. Telemetry data on an actual flight vehicle from the selected telemetry data source or processor is provided to the flight vehicle image generation computer system. An image of a flight vehicle is generated on the flight vehicle image generation computer system using this telemetry data.

Various refinements exist of the features noted in relation to the third aspect of the present invention. Further features may also be incorporated in the third aspect of the present invention as well. These refinements and additional features may exist individually or in any combination. A graphical user interface may be utilized for requesting/inputting information in any appropriate manner regarding the identify of the location(s) where or the display(s) on which the image is to be generated in accordance with the third aspect. In one embodiment, a list of those locations or displays that are available for generating an image of a flight vehicle in accordance with the third aspect are displayed for review and selection (e.g., by an operator of the flight vehicle image generation computer system; in the form of a drop-down menu or the like on a graphical user interface). However, any appropriate way for prompting the identification of the location(s) where or display(s) on which a flight vehicle image is to be generated, of inputting or entering the desired/required information as to the identify of the location(s) where or display(s) on which a flight vehicle image is to be generated, or both, may be utilized in relation to the third aspect.

The image of the flight vehicle may be generated at one or more locations by the flight vehicle image generation computer system in accordance with the third aspect. That is, the flight vehicle image generation computer system may be configured to generate the image of a flight vehicle at different locations and on multiple displays, including simultaneously at these different locations and on separate displays. Those locations or displays where the image may be generated by the flight vehicle image generation computer system may be identified for selection (e.g., in the form of a drop-down menu on a graphical user interface associated with the flight vehicle image generation computer system). Any way of identifying those locations or displays where the image is to be generated may be utilized in relation to the third aspect, and more generally any way of inputting those locations or displays where the image is to be generated may be utilized in relation to the third aspect. Moreover, any appropriate physical display for generating an image of a flight vehicle may be utilized at each of the various locations that are available to the flight vehicle image generation computer system. Preferably, the image that is generated on any such display is in three-dimensional form and further is generated at least generally on a real-time basis (e.g., no more than about a five (5) second delay or lag from the actual vehicle flight event, or no more than about a three (3) second delay from receipt of valid telemetry).

There are a number of other characterizations regarding the provision of the telemetry data on the actual flight vehicle to the flight vehicle image generation computer system in accordance with the third aspect. In one embodiment, the flight vehicle image generation computer system invokes or issues a request for telemetry data to a particular telemetry data source or processor. This request may require that the telemetry data be provided in accordance with a data profile that is specific to the type or class of the flight vehicle for which an image is being generated and that is stored in relation to the flight vehicle image generation computer system (e.g., in a database on a computer-readable storage medium, such as in a flight vehicle database). A client/server architecture may be utilized to acquire telemetry data on the actual flight vehicle as well. For instance, a server may be provided for each telemetry data source or processor that may be utilized by the flight vehicle image generation computer system for receiving telemetry data to generate an image of a flight vehicle. Preferably, each server is local to its associated telemetry data source or processor (e.g., located on the "front-end" of such a telemetry data source or processor and at the same physical location). In any case, the flight vehicle image generation computer system may include a client that operatively interfaces with each of these servers. That is, regardless of which telemetry data source or processor is being utilized by the flight vehicle image generation computer system to generate an image of a flight vehicle, the corresponding telemetry data may be directed through a common client associated with the flight vehicle image generation computer system. This client/server architecture allows additional telemetry data sources or processors to be utilized by the flight vehicle image generation computer system simply by "installing" a new server in relation to the new telemetry data source or processor. Telemetry data from this "new" telemetry data source or processor is still then directed through the common client.

A request may be made regarding the identity of the telemetry data source or processor for providing telemetry data to the flight vehicle image generation computer system for generation of an image of a flight vehicle in accordance with the third aspect. Information regarding the identity of the desired telemetry data source or processor is entered or input to the flight vehicle image generation computer system. A graphical user interface may be utilized by the third aspect for requesting/inputting information in any appropriate manner regarding the identify of the telemetry data source or processor to provide telemetry data on the actual flight vehicle for which image generation by the flight vehicle image generation computer system in accordance with the third aspect is desired. In one embodiment, a list of those telemetry data sources that are available for providing telemetry data on the actual flight vehicle for generation of an image of a flight vehicle in accordance with the third aspect are displayed for review and selection (e.g., by an operator of the flight vehicle image generation computer system; in the form of a drop-down menu or the like on a graphical user interface). However, any appropriate way may be utilized by the third aspect for prompting the identification of the telemetry data source or processor for providing telemetry data on the actual flight vehicle for which image generation by the flight vehicle image generation computer system in accordance with the third aspect is desired, of inputting or entering the desired/required information as to the telemetry data source or processor for providing telemetry data on the actual flight vehicle for which image generation by the flight vehicle image generation computer system in accordance with the third aspect is desired, or both.

The flight vehicle image generation computer system associated with the third aspect may allow telemetry data to be obtained from any of multiple telemetry data sources or processors. This would allow the flight vehicle image generation computer system to switch from a first telemetry data source or processor to a second, different telemetry data source or processor. Any switch of this type could even be done during generation of an image of a flight vehicle (e.g., "on-the-fly" or while the flight vehicle image generation computer system is in the process of generating an image of a flight vehicle). One reason for allowing the flight vehicle image generation computer system to retrieve telemetry data from any of multiple telemetry data sources or processors is that the communication link may be lost between the flight vehicle image generation computer system and the telemetry data source or processor being relied upon for telemetry data on the actual flight vehicle for image generation in accordance with the third aspect. Another is that the telemetry data source or processor that is providing the telemetry data for the flight vehicle image generation computer system may become unstable, inoperable, or unavailable, all of which would adversely affect the ability to generate an image of a flight vehicle in accordance with the third aspect on the desired basis.

A request may be made regarding the type or class of the particular flight vehicle for which an image is to be generated by the flight vehicle image generation computer system in accordance with the third aspect. Information regarding the vehicle type or class of the flight vehicle may be entered or input to the flight vehicle image generation computer system in response to such a request. The flight vehicle image generation computer system associated with the third aspect may be used to generate images of multiple types or classes of flight vehicles (e.g., launch vehicles, satellites, aircraft, ground vehicles). Any type or class of flight vehicle may be stored on the flight vehicle image generation computer system and in any appropriate manner. For instance, each type or class of flight vehicle may be stored in a database on a computer-readable storage medium in a manner so as to allow a particular type or class of flight vehicle to be retrieved (e.g., using an appropriate identifier, a textual description, or both). The flight vehicle image generation computer system may be configured so that a data profile is stored on the system in relation to each type or class of flight vehicle for which an image may be generated using this system. Once the relevant data profile has been retrieved, telemetry data on the actual flight vehicle may be received by the flight vehicle image generation computer system in accordance with this data profile for generation of an image of the flight vehicle.

A graphical user interface may be utilized for requesting/inputting information in any appropriate manner regarding the type or class of flight vehicle for which an image generation by the flight vehicle image generation computer system in accordance with the third aspect is desired. In one embodiment, a list of those vehicle types or classes that are available for generation of an image thereof in accordance with the third aspect are displayed for review and selection (e.g., by an operator of the flight vehicle image generation computer system; in the form of a drop-down menu or the like on a graphical user interface). However, any appropriate way may be utilized by the third aspect for prompting the identification of the type or class of flight vehicle for which image generation by the flight vehicle image generation computer system in accordance with the third aspect is desired, of inputting or entering the desired/required information as to the type or class of flight vehicle for which image generation by the flight vehicle image generation computer system in accordance with the third aspect is desired, or both.

The flight vehicle image generation computer system associated with the third aspect may also be configured to allow for the input of a configuration or "config" script in relation to a selected vehicle type or class in accordance with the foregoing (e.g., through a graphical user interface). The config script may be of the type that configures one or more aspects of the flight vehicle image generation computer system for the selected vehicle type or class. Multiple config scripts for a given vehicle type or class may be stored in relation to the flight vehicle image generation computer system associated with the third aspect and displayed for selection of the desired config script (e.g., through a drop-down menu on a graphical user interface). Any way of inputting the desired config script may be utilized. Yet another option that may be utilized by the flight vehicle image generation computer system of the third aspect is to allow for the input of a flight epoch in the relation to a particular flight of the flight vehicle. The flight epoch in effect establishes the layout of one or more celestial objects (including all or part of the solar system) to allow the telemetry data on the flight vehicle to be properly interpreted and utilized by the flight vehicle image generation computer system. Any appropriate identifier may be utilized in relation to this selection (e.g., a time/date specification or other textual description, since the flight epoch is time-dependent). Multiple flight epochs may be made stored in relation to the system and made available for selection of the desired flight epoch (e.g., through a drop-down menu on a graphical user interface).

A fourth aspect of the present invention generally relates to a flight vehicle image generation computer system. This system may be used to generate an image of a flight vehicle from telemetry data on an actual flight vehicle of a particular type or class. A plurality of vehicle types or classes are stored in relation to the system such that the class or type of the actual flight vehicle may be input/selected through a graphical user interface. Multiple telemetry data sources or processors are also stored in relation to the flight vehicle image generation computer system and are operatively interconnected/interconnectable with the system. Any one of these telemetry data sources or processors may be input/selected through a graphical user interface so as to provide telemetry data on the actual flight vehicle. This telemetry data is used by the system to generate/display the flight vehicle image at a designated location or display. Multiple image generation locations or displays are stored in relation to the flight vehicle image generation computer system such that any one or more of these image generation locations or displays may be input/selected through a graphical user interface. The flight vehicle image is then generated/displayed at the selection location(s)/display(s) based upon the telemetry data on the actual flight vehicle.

DETAILED DESCRIPTION OF THE INVENTION

Figure 1:
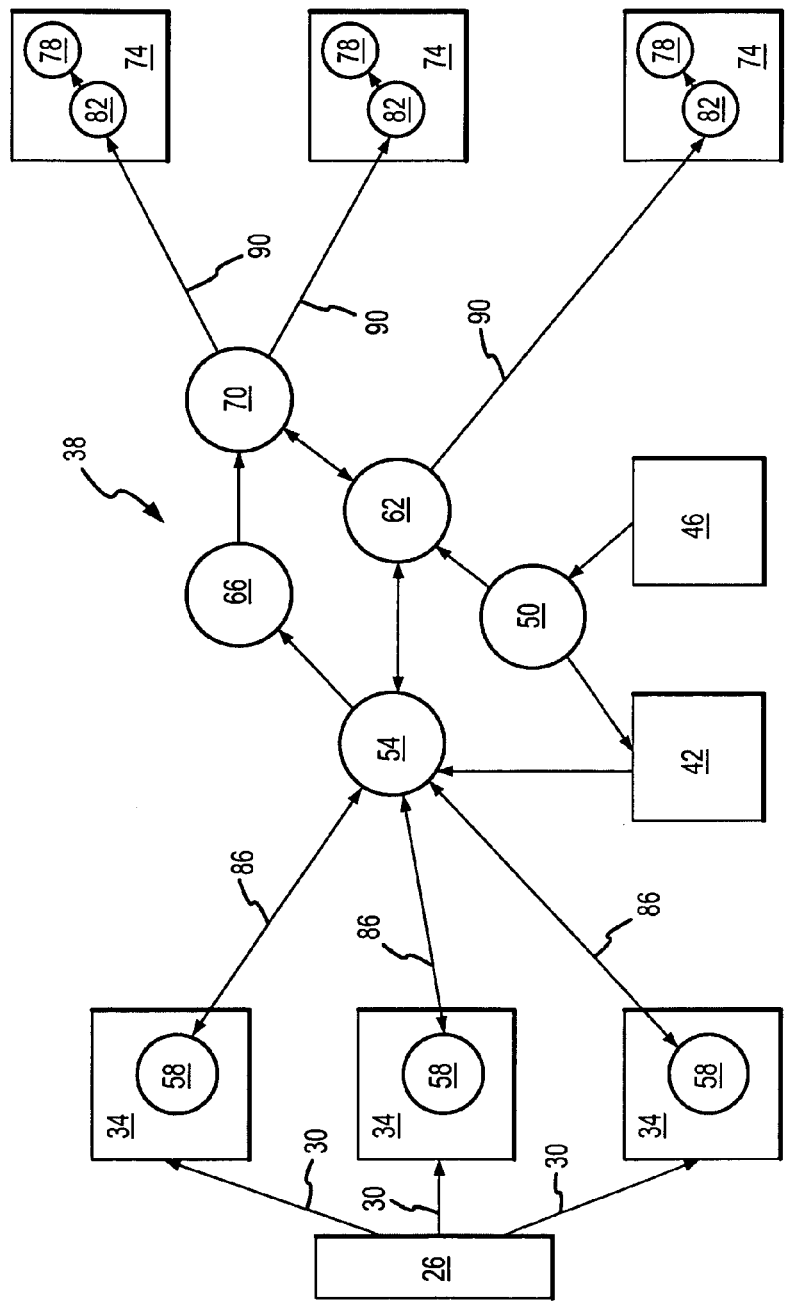
FIG. 1 is a schematic of one embodiment of a flight vehicle image generation computer system.

The present invention will now be described in relation to the accompanying drawings which at least assist in illustrating its various pertinent features. FIGS. 1–2C illustrates one embodiment of a flight vehicle image generation computer system 38 for producing a flight vehicle image 80 (FIG. 2C, which depicts a representative output on a display 78 of the flight vehicle image generation computer system 38) relating to a flight vehicle 26 (FIG. 1), preferably on at least substantially a real-time basis and in three-dimensional form. The purpose of the flight vehicle image generation system 38 is not to provide "actual video footage" of the flight vehicle 26 during operation. Instead, telemetry data on the flight vehicle 26 is used by the flight vehicle image generation system 38 to manipulate a representative image 80 of the flight vehicle 26 in a manner that corresponds with the current behavior of the flight vehicle 26 during operation (e.g., to emulate the trajectory of the flight vehicle 26; to emulate the position and attitude of the flight vehicle 26; to emulate articulations of the flight vehicle 26; to emulate maneuvers of the flight vehicle 26; to emulate engine firings associated with the flight vehicle 26; to emulate any staging associated with the flight vehicle 26; to emulate any communication link(s) associated with the flight vehicle 26). The actual flight vehicle image 80 that is generated and manipulated may be an electronic image of a flight vehicle, such as in the form of a CAD file that is stored on a computer-readable storage medium, although preferably this electronic flight vehicle image 80 is of the same type or class as the flight vehicle 26 that is providing the telemetry data.

Referring principally to FIGS. 1 and 2C, the flight vehicle 26 may be of any appropriate type or class for purposes of the flight vehicle image generation computer system 38, and may be of any appropriate configuration within each type or class. Representative flight vehicle types or classes include launch vehicles (that which is utilized in the initial launch from Earth and to transport its payload a certain distance above the Earth's surface), spacecraft (e.g., satellites), aircraft, and ground vehicles. Telemetry data on the flight vehicle 26 (e.g., during flight or orbit) is transmitted via an appropriate signal 30 (e.g., radio frequency) to any appropriate number of telemetry data sources or processors 34 (three in the illustrated embodiment) that are typically located back on Earth. Each telemetry data source or processor 34 may be of any appropriate type or configuration. Representative telemetry data sources or processors 34 that may be utilized by the flight vehicle image generation computer system 38 include the Loral System 90 (TPE), Loral 510, Loral 550, Nighthawk, PowerHawk, Braxton TPS, and Defense Systems TPSR (Telemetry Processor System Revised) and TPS2 (Telemetry Processing System 2). Generally, the flight vehicle image generation computer system 38 produces the flight vehicle image 80 from the telemetry data that is provided on the flight vehicle 26 to a particular telemetry data source or processor 34, that in turn is provided to the flight vehicle image generation computer system 38.

The flight vehicle image generation computer system 38 includes what may be characterized as a suite of software programs which communicate in any appropriate manner (e.g., TCP/IP network sockets, RS-232C communication lines, shared memory, semaphores, UNIX System V Inter-Process Communications (IPC)). This suite of software programs may share simple data files (e.g., reside on a single machine). However, one or more computers each having one or more of these software programs may be utilized as well. Each software program also preferably is allowed to dedicate its processing resources to a single general task. The fundamental architecture of the system 38 is such that it minimizes CPU utilization (i.e., does not unnecessarily consume CPU resources). Moreover, the system 38 may be configured to enhance processing speed and minimize overhead by using shared memory, semaphores, and IPC.

Components of the flight vehicle image generation computer system 38 include a first graphical user interface 50, a database 42, a flight vehicle database 46, a client 54, a separate server 58 associated with each of the telemetry data sources or processors 38, a second graphical user interface 62, a data monitor 66, a modeling software driver 70, and any appropriate number of what may be characterized as remote computers 74 (three in the illustrated embodiment). Each remote computer 74 includes appropriate modeling software 82 that communicates with a corresponding and an appropriate display 78.

The first graphical user interface 50 and the second graphical user interface 62 of the flight vehicle image generation computer system 38 (as well as a graphical user interface that may be associated with the modeling software driver 70) may be functionally combined (not shown) or remain functionally separate and in accordance with the illustrated embodiment to control the various aspects of the operation of the flight vehicle image generation computer system 38. Generally, the first graphical user interface 50 may be configured to "walk" an operator of the flight vehicle image generation computer system 38 through the various steps to "initialize" the flight vehicle image generation computer system 38 for generating a flight vehicle image 80 relating to the flight vehicle 26 in a manner so as to reduce the potential for encountering any errors in this "initialization." The second graphical user interface 62 could then be configured to allow an operator of the system 38 to undertake more advanced operations in relation to the flight vehicle image generation computer system 38.

Five general setup or initialization functions are available through the first graphical user interface 50, the second graphical user interface 62, and/or any other graphical user interface of the flight vehicle image generation computer system 38. One is that the flight vehicle image generation computer system 38 of FIG. 1 allows the class or type of the flight vehicle 26 to be input for generation of a related flight vehicle image 80. Entry of this information may be done in any appropriate manner (e.g., keyboard; mouse; pre-defined file; system environment variable; program invocation argument) and using any appropriate description or identifier for the type or class of the flight vehicle 26. In one embodiment, each flight vehicle type or class that is available for use with the flight vehicle image generation computer system 38 is appropriately identified on a drop-down menu (e.g., drop-down menu 168 of FIG. 2B) on the first graphical user interface 50 and/or the second graphical user interface 62.

Flight vehicle types or classes may be added to the flight vehicle image generation computer system 38 in any appropriate manner.

Identification of the type or class of the flight vehicle 26 for which a flight vehicle image 80 may be generated by the flight vehicle image generation computer system 38 initiates the retrieval of a corresponding data profile that is stored in the flight vehicle database 46. That is, a data profile is stored in the flight vehicle database 46 for each type or class of the flight vehicle 26 that may be used to generate a flight vehicle image 80 using the flight vehicle image generation computer system 38. Each data profile generally identifies one or more characteristics of the data that is relevant to the corresponding type or class of flight vehicle 26 in relation to the flight vehicle image generation computer system 38 being able to generate a flight vehicle image 80 using the telemetry data being sent from the flight vehicle 26 via a signal 30 (representative data profile characteristics including without limitation data type/content and data rate).

Another setup or initialization function that is available through a graphical user interface associated with the flight vehicle image generation computer system 38 relates to retrieving what may be characterized as a data set (e.g., a configuration or "config" script) from the flight vehicle database 46 (or otherwise stored in a computer-readable storage medium associated with the system 38) and that is thereafter used to configure various aspects of the flight vehicle image generation computer system 38. In one embodiment, the resulting configuration of the system 38 in accordance with the config script may not be modified for the current flight of the flight vehicle 26 through any graphical user interface associated with the system 38. In any case, each type or class of flight vehicle 26 that is stored in the flight vehicle database 46 will have at least one config script associated therewith. The flight vehicle image generation computer system 38 allows for the selection of a particular config script that is associated with the selected type or class of flight vehicle 26. Entry of this information through a graphical user interface associated with the system 38 may be done in any appropriate manner (e.g., keyboard; mouse; pre-defined file; system environment variable; program invocation argument) and using any appropriate description or identifier for the desired config script. In one embodiment, each config script that is available for use with the selected type or class of flight vehicle 26 is appropriately identified on a drop-down menu (e.g., drop-down menu 194 in FIG. 2B) on a graphical user interface (e.g., graphical user interface 162 in FIG. 2B) associated with the flight vehicle image generation computer system 38.

Yet another setup or initialization function that is available through a graphical user interface associated with the flight vehicle image generation computer system 38 relates to establishing/selecting what may be characterized as a flight epoch for operation of the flight vehicle 26. This flight epoch is used by one or more aspects of the flight vehicle image generation computer system 38 (e.g., the modeling software driver 70 and/or the modeling software 82 and/or the data monitor and validation software 66). The flight vehicle image generation computer system 38 allows multiple flight epochs to be stored on the system 38 in relation to an upcoming flight of the vehicle 26. Each flight epoch in effect establishes the layout of one or more celestial objects (including all or part of the solar system) to allow the telemetry data on the flight vehicle 26 to be properly interpreted and utilized by the system 38. The flight epoch is of course time-dependent, and the multiple flight epochs that are stored in relation to the system 38 may be incremental delays from an initial flight epoch. In any case, selection of the desired flight epoch (possibly specified in relation to a time and date) through a graphical user interface associated with the system 38 may be done in any appropriate manner (e.g., keyboard; mouse; pre-defined file; system environment variable; program invocation argument) and using any appropriate description or identifier for the desired time and date that establishes the flight epoch. In one embodiment, the time and date associated with each flight epoch stored in relation to the system 38 is appropriately identified on a drop-down menu (e.g., drop-down menu 200 in FIG. 2B) on a graphical user interface (e.g., graphical user interface 162 in FIG. 2B) associated with the flight vehicle image generation computer system 38.

Another setup or initialization function available through the first graphical user interface 50 and/or the second graphical user interface 62 of the flight vehicle image generation computer system 38 relates to the manner in which the telemetry data on the flight vehicle 26 will be retrieved for generation of a flight vehicle image 80. Generally, the flight vehicle image generation computer system 38 allows an operator to select any particular telemetry data source or processor 34 to provide telemetry data from which a flight vehicle image 80 will be generated that relates to the flight vehicle 26. That is, the flight vehicle image generation computer system 38 is not limited to receiving telemetry data from a single telemetry data source or processor 34. Instead, any appropriate number and/or type of telemetry data sources or processors 34 may be utilized by the flight vehicle image generation computer system 38. Entry of this information through the first graphical user interface 50 and/or second graphical user interface 62 may be done in any appropriate manner (e.g., keyboard; mouse; pre-defined file; system environment variable; program invocation argument) and using any appropriate description or identifier for the desired telemetry data source or processor 34 for the current image generation operation. In one embodiment, each telemetry data source or processor 34 that is available for use with the flight vehicle image generation computer system 38 is appropriately identified on a drop-down menu (e.g., drop-down menu 178 in FIG. 2B) on the first graphical user interface 50 and/or the second graphical user interface 62 (e.g., by geographical description; by Internet Protocol address). Additional telemetry data sources or processors 34 may be added in relation to the flight vehicle image generation computer system 38 in any appropriate manner.

The flight vehicle image generation computer system 38 utilizes a client/server architecture in relation to the various telemetry data sources or processors 34 that are available to the system 38. In this regard, the flight vehicle image generation computer system 38 includes a client 54 that may be local to the graphical user interface 50 and/or 62. The flight vehicle image generation computer system 38 further includes a server 58 for each of the telemetry data sources or processors 34 that may be utilized by the system 38. Each server 58 is preferably local in relation to its corresponding telemetry data source or processor 34 (e.g., resides on the "front-end" of the corresponding telemetry data source or processor 34). In any case, the client 54 is operatively connected with each server 58 of the system 38 by a communication link 86. Each individual communication link 86 may be of any appropriate type (e.g., a network connection, an RS-232 cable).

Each server 58 is specific to its corresponding telemetry data source or processor 34 and is configured to communicate therewith. The data profile from the flight vehicle database 46 for the particular flight vehicle 26 will be provided to the client 54. Instead of the flight vehicle image generation computer system 38 automatically receiving telemetry data from a particular telemetry data source or processor 34, the client 54 invokes a request for telemetry data and typically in accordance with one or more aspects of a particular data profile. A particular server 58 will thereby receive a request for telemetry data from the client 54 for telemetry data on the flight vehicle 26. This particular server 58 will output (or cause the output of) telemetry data from its corresponding telemetry data source or processor 34 in accordance with the request from the client 54 (e.g., the server 58 will place the telemetry data in the format requested by the client 54 and at the rate specified by the client 54; the server 58 will cause the telemetry data to be output to the client 54 in the requested manner). This output will then be directed through the corresponding communication link 86 back to the client 54. In this sense each server 58 in effect functions as a broker between the client 54 and the corresponding telemetry data source or processor 34. All telemetry data directed through the client 54 is preferably stored on a computer-readable storage medium associated with the flight vehicle image generation computer system 38. Preferably this telemetry data is "date stamped" and associated with a particular flight of the flight vehicle 26.

Telemetry data from a particular telemetry data source or processor 34 is ultimately provided to the data monitor 66 of the flight vehicle image generation computer system 38. In the illustrated embodiment, the telemetry data actually first passes through the client 54 and then to the data monitor 66. One function provided by the data monitor 66 is to assess the validity of the telemetry data prior to being used to generate a flight vehicle image relating to the flight vehicle 26. Any appropriate type of "validity check" or filter may be programmed into the data monitor 66 through the first and/or second graphical user interface 50, 62. More generally, the first and/or second graphical user interface 50, 62 may be used to control the operation of the data monitor 66. As an example, the data monitor 66 may receive telemetry data in the form of packets having a plurality of data types. There may be a validation requirement in relation to each of these data types. The data monitor 66 may be configured so as to not disregard an entire data packet merely because one or more validation requirements are not met. That is, the failure of a given data packet to follow one or more "rules" programmed into the data monitor 66 may not in fact preclude the data monitor 66 from passing this data packet onto the modeling software 82 for generation of a flight vehicle image 80 relating to the flight vehicle 26.

Additional functionality may be incorporated at the data monitor 66 of the flight vehicle image generation computer system 38. For instance, the data monitor 66 may be programmed for mark event detection, determining staging and major event sequencing associated with the flight vehicle 26, determining articulations of the flight vehicle 26, and performing coordinate system transformations. Operation of the data monitor 66 may be suspended when not evaluating telemetry data so as to not unnecessarily consume system resources. When new telemetry data is available for validation, a semaphore may be signaled so as to indicate that the data monitor 66 should be awakened. After validating this new telemetry data, the data monitor 66 may once again return to a suspended mode.

It should be noted that a termination in the flow of telemetry data into or out of the data monitor 66 does not terminate the operation of the flight vehicle image generation computer system 38. The system 38 may be configured to simply pause the flight vehicle image 80 on the selected display(s) 78 (preferred for the case of launch vehicles). The system 38 may also be configured to estimate the flight vehicle image 80, or to estimate the behavior of the flight vehicle 26 and depict the same through the flight vehicle image 80. Finally, the system 38 may be configured to use propagation techniques based upon the last know state of the flight vehicle 26 and to then convey the results via the flight vehicle image 80 on the selected display(s) 78.

The output from the data monitor 66 is directed to the modeling software driver 70. One function of the modeling software driver 70 is to convert the output from the data monitor 66 into the form required by the modeling software 82 being used for generating a flight vehicle image 80 relating to the flight vehicle 26. The modeling software driver 70 may also include a graphical user interface (or be accessible through the first and/or second graphical user interface 50) for controlling one or more aspects of the configuration/operation of the modeling software driver 70. Such a graphical user interface may be used to control the flow of data to the particular modeling software 82. Moreover, such a graphical user interface may be used to modify the data flow in one or more respects. One instance where this may be desirable is to enhance the visualization of only slight changes of the flight vehicle 26 (e.g., to more clearly show a 1° articulation of a rocket engine). The graphical user interface associated with the modeling software driver 70 may be used to transform the data in any appropriate manner (e.g., using a simple multiplier; in accordance with any function (polynomial or otherwise) to make this slight change of the flight vehicle 26 more perceptible on the corresponding display 78). The graphical user interface associated with the modeling software driver 70 may also be used to manually override or manually force articulations or graphics behavior (e.g., turn ground trace on, turn ground trace off, turn communication beams on, turn communication beams off, show ground stations, hide ground stations).

The output from the modeling software driver 70 is directed to the designated modeling software 82 that preferably resides on a particular remote computer 74. This transmission is over a corresponding communication link 90 between the corresponding remote computer 74 and the modeling software driver 70. Each individual communication link 90 may be of any appropriate type, including without limitation those discussed above in relation to the communication links 86.

The modeling software 82 at each of the remote computers 74 may be of any appropriate type. Although preferably the same type of modeling software 82 is used at each of the remote computers 74 of the flight vehicle image generation computer system 38, such need not necessarily be the case. The modeling software 82 generates a flight vehicle image 80 relating to the flight vehicle 26 on the corresponding display 78 from the telemetry data on the flight vehicle 26 that has been provided to the modeling software 82 in accordance with the foregoing. One embodiment of an output from one of the displays 78 is presented in FIG. 2C. Preferably, this output on the display(s) 78 is a three-dimensional representation of a flight vehicle image 80 that relates to the flight vehicle 26 and is provided on at least a substantially real-time basis (e.g., no more than about a five (5) second delay from the actual vehicle 26 flight event, or no more than about a three (3) second delay from receipt of valid telemetry). Other information may be output from the modeling software 82 to the corresponding display 78. For instance, the flight vehicle image 80 relating to the flight vehicle 26 may be displayed relative to Earth 22 (FIG. 2C), one or more extraterrestrial objects (e.g., planets, stars), or both, and any communication link(s) between the flight vehicle 26 and any other object may also be displayed via the flight vehicle image 80. In one embodiment, the modeling software 82 is the "Satellite Tool Kit®" available from Analytical Graphics, Inc. in Malvern, Pa.

Figure 2A:
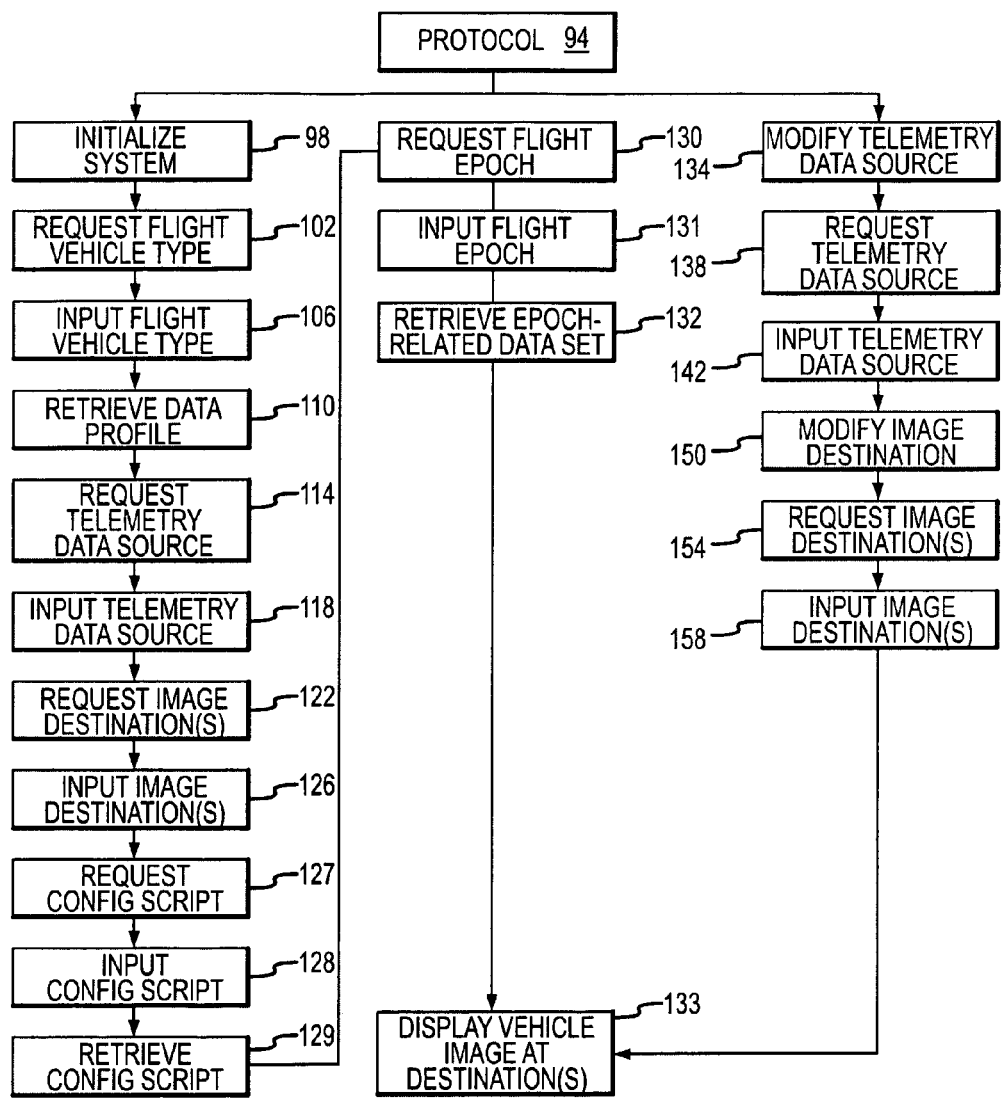
FIG. 2A is a flowchart of one embodiment of an operational protocol that may be utilized by the flight vehicle image generation computer system of FIG. 1.

One embodiment of a protocol 94 is illustrated in FIG. 2A and which schematically depicts various options associated with the operation of the flight vehicle image generation computer system 38 of FIG. 1. This protocol 94 may be implemented through any appropriate graphical user interface associated with the flight vehicle image generation computer system 38 (e.g., using the first graphical user interface 50 and/or the second graphical user interface 62) or otherwise. Moreover, the functionality provided by the protocol 94 may be implemented in any appropriate manner and is not limited to the "flowchart logic" presented in FIG. 2A.

The flight vehicle image generation computer system 38 of FIG. 1 may be initialized through execution of step 98 of the protocol 94 of FIG. 2A. One embodiment of a single graphical user interface 162 is presented in FIG. 2B that may be used in relation to step 98 of the protocol 94. There are five primary features that are available through execution of step 98 of the protocol 94, and which may be executed in any order and in any appropriate manner. One desirable feature of the flight vehicle image generation computer system 38 is that it may be utilized in relation to multiple types or classes of flight vehicles 26. Stated another way, the flight vehicle image generation computer system 38 is not specific to any one flight vehicle 26. In this regard, step 102 of the protocol 94 prompts or requests identification of the class or type of the flight vehicle 26 for which a flight vehicle image 80 is to be generated in the above-noted manner (e.g., flight vehicle type/class prompt 164 on the graphical user interface 162 of FIG. 2B). The type or class of the flight vehicle 26 for which a flight vehicle image 80 is to be generated is then input at step 106 of the protocol 94 (e.g., in data entry segment 166 on the graphical user interface 162 of FIG. 2B). Any appropriate way of addressing this functionality may be utilized. For instance, the flight vehicle image generation computer system 38 may be configured to display a default type or class of flight vehicle 26, a drop-down menu of all of the types or classes of flight vehicles 26 stored in the flight vehicle database 46 or otherwise available to the flight vehicle image generation computer system 38 may be displayed (e.g., via drop-down menu 168 on the graphical user interface 162 of FIG. 2B) for selection in a manner known in the art (e.g., "clicking" on the desired type of class of flight vehicle 26), or the operator may be required to manually enter an appropriate identifier associated with the flight vehicle 26 for which a flight vehicle image 80 is to be generated. Any way of identifying the type or class of the flight vehicle 26 for which a flight vehicle image 80 is to be generated may be employed by the protocol 94. In any case and as noted above, the identification of the type or class of the flight vehicle 26 for which a flight vehicle image 80 is to be generated results in the retrieval of the data profile associated with this type or class of flight vehicle 26 from the flight vehicle database 46, through execution of step 110 of the protocol 94 and for invoking a request for telemetry data from a designated telemetry data source or processor 34 in the above-noted manner.

Another desirable feature that is available through execution of the initialization step 98 of the protocol 94 of FIG. 2A is the selection of the particular telemetry data source or processor 34 that is operatively interconnected with the flight vehicle image generation computer system 38 and that will be utilized to generate a flight vehicle image 80 relating to the flight vehicle 26 in accordance with the foregoing. Any appropriate number of telemetry data sources or processors 34 may be integrated with the flight vehicle image generation computer system 38 of FIG. 1. That is, the flight vehicle image generation computer system 38 makes more than one telemetry data source or processor 34 available for generating an image 80 of the flight vehicle 26, although the image 80 of the flight vehicle 26 is in fact ultimately generated from the telemetry data provided from the selected telemetry data source or processor 34. This provides a number of benefits. One is flexibility in that it allows an operator of the flight vehicle image generation computer system 38 to use the "best" telemetry data source or processor 34 for a given flight vehicle 26 and/or situation. Moreover, it also allows an operator of the flight vehicle image generation computer system 38 to switch from one telemetry data source or processor 34 to another telemetry data source or processor 34. This may be beneficial in any number of situations. For instance, a switch from one telemetry data source or processor 34 to another telemetry data source or processor 34 associated with the flight vehicle image generation computer system 38 may be desirable in the event of the loss of a communication link with the selected telemetry data source or processor 34, or in the event the selected telemetry data source or processor 34 "goes down" or otherwise becomes unavailable or not fully operational. Any such switch may be made during operation of the flight vehicle image generation computer system 38 or "on-the-fly", and this reconfiguration of the system 38 may be implemented with less than about two (2) seconds of data loss.

Figure 2B:
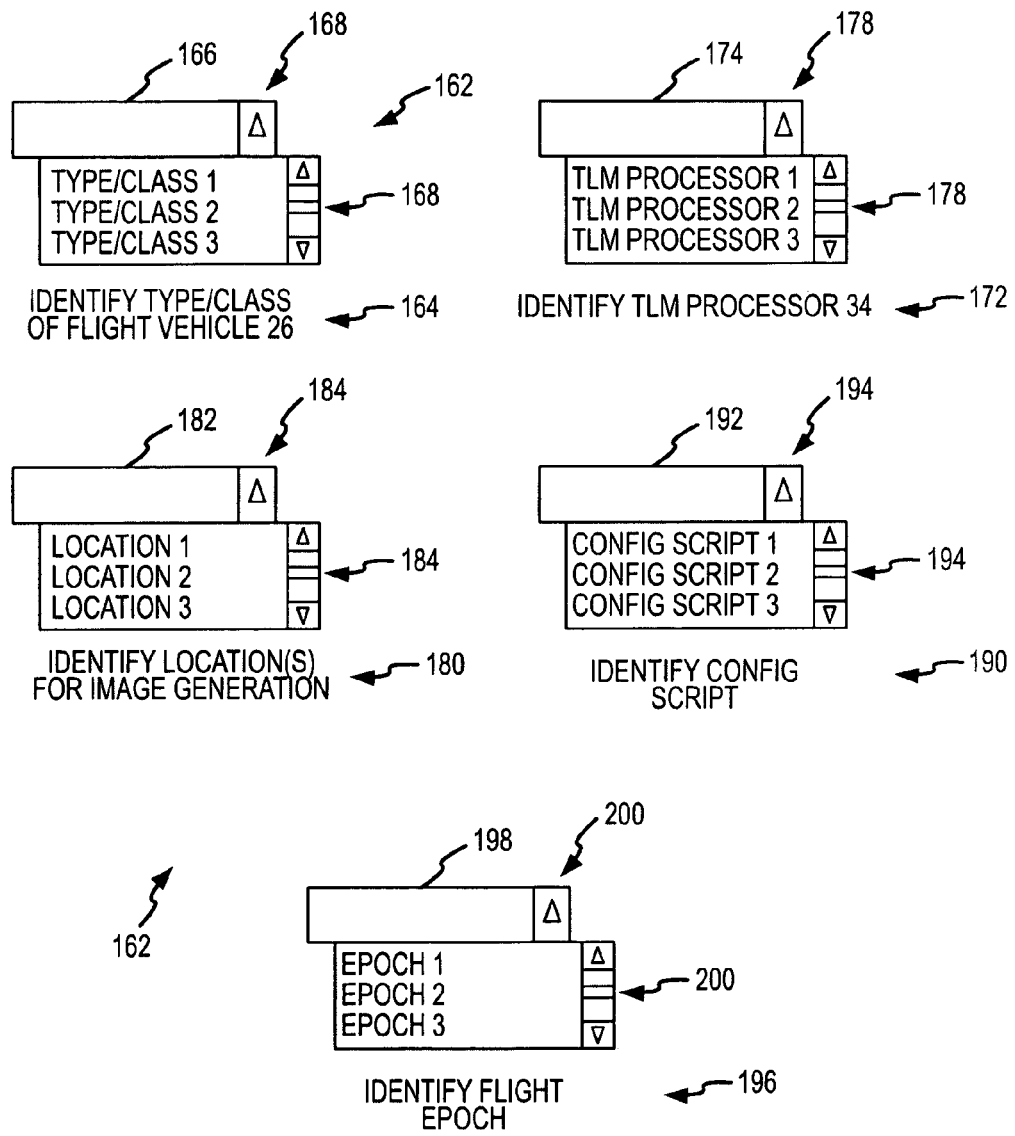
FIG. 2B is a schematic of one embodiment of a graphical user interface that may be utilized by the flight vehicle image generation computer system of FIG. 1.
Figure 2C:
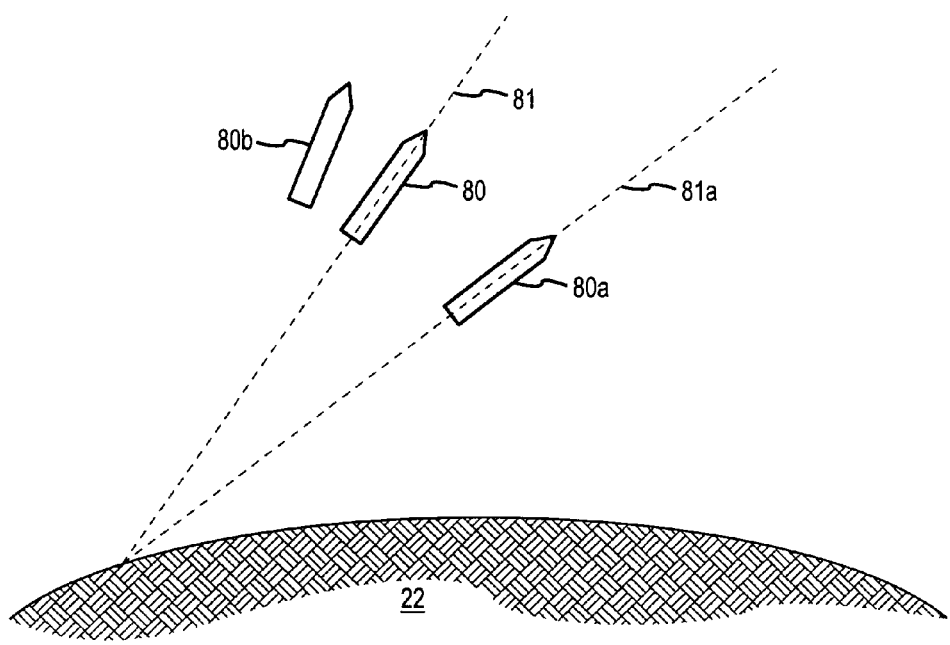
FIG. 2C is one embodiment of an output on a display used by the flight vehicle image generation computer system of FIG. 1.

Step 114 of the protocol 94 of FIG. 2A prompts or requests identification of the particular telemetry data source or processor 34 from which telemetry data is desired for generating a flight vehicle image 80 relating to the flight vehicle 26 (e.g., telemetry data processor prompt 172 on the graphical user interface 162 of FIG. 2B). This single telemetry data source or processor 34 is then input at step 118 of the protocol 94 (e.g., in data entry segment 174 on the graphical user interface 162 of FIG. 2B). Any appropriate way of addressing this functionality may be utilized. For instance, the flight vehicle image generation computer system 38 may be configured to display a default telemetry data source or processor 34, a drop-down menu of all telemetry data sources or processors 34 associated with the flight vehicle image generation computer system 38 (e.g., via drop-down menu 178 on the graphical user interface 162 of FIG. 2B) may be displayed for selection in a manner known in the art (e.g., "clicking" on the desired telemetry data source or processor 34), or the operator may be required to manually enter an appropriate identifier or the like associated with the telemetry data source or processor 34 to be selected. Geographical descriptions of each telemetry data source or processor 34 available to the flight vehicle image generation computer system 38 may be displayed to an operator or otherwise to facilitate selection of a particular telemetry data source or processor 34 for use in generating a flight vehicle image 80 relating to the flight vehicle 26, Internet Protocol addresses for each telemetry data source or processor 34 available to the flight vehicle image generation computer system 38 may be displayed to an operator or otherwise to facilitate selection of a particular telemetry data source or processor 34 for use in generating a flight vehicle image 80 relating to the flight vehicle 26, or both. Any way of identifying the telemetry data source or processor 34 from which telemetry data on the flight vehicle 26 will be used to generate an image 80 relating to the flight vehicle 26 in accordance with the foregoing may be employed by the protocol 94.

Flexibility is also incorporated into the configuration of the flight vehicle image generation computer system 38 in relation to where the image 80 of the flight vehicle 26 is displayed. Multiple displays 78 may be associated with the flight vehicle image generation computer system 38 for conveying an image 80 relating to the flight vehicle 26 in accordance with the foregoing. Any appropriate number of displays 78 may be integrated with the flight vehicle image generation computer system 38 of FIG. 1, and each of these displays 78 may be disposed at any desired/required location. That is, the flight vehicle image generation computer system 38 makes more than one display 78 available for generating an image 80 relating to the flight vehicle 26. In this regard, step 122 of the protocol 94 of FIG. 2A prompts or requests identification of the destination(s) to receive an image 80 relating to the flight vehicle 26 on the corresponding display 78 (e.g., image generation location prompt 180 on the graphical user interface 162 of FIG. 2B). This location(s) where the flight vehicle image 80 is to be generated/displayed is then input at step 126 of the protocol 94 (e.g., in data entry segment 182 on the graphical user interface 162 of FIG. 2B). Any appropriate way of addressing this functionality may be utilized. For instance, the flight vehicle image generation computer system 38 may be configured to display a default image generation destination(s), a drop-down menu of all image generation destinations associated with the flight vehicle image generation computer system 38 (e.g., drop-down menu 184 on the graphical user interface 162 of FIG. 2B) may be displayed for selection in a manner known in the art (e.g., "clicking" on the desired image generation destination(s)), or the operator may be required to manually enter an appropriate identifier or the like associated with the image generation destination(s) to be selected. Geographical descriptions of each image generation destination available to the flight vehicle image generation computer system 38 may be displayed to an operator or otherwise to facilitate selection of a particular image generation destination for conveying an image 80 relating to the flight vehicle 26, Internet Protocol addresses and English text descriptions or abbreviations of each remote computer 74 available to the flight vehicle image generation computer system 38 may be displayed to an operator or otherwise to facilitate selection of a particular image generation destination for generating an image 80 relating to the flight vehicle 26, or both. Any way of identifying the image generation destination(s) or display(s) 78 on which an image 80 relating to the flight vehicle 26 will be generated in accordance with the foregoing may be employed by the protocol 94.

Another desirable feature of the flight vehicle image generation computer system 38 is that multiple config scripts may be stored on the system 38 in relation to each type or class of flight vehicle 26 that is also stored on the system 38. As noted above, each config script or data set is used to configure various aspects of the flight vehicle image generation computer system 38. Step 127 of the protocol 94 prompts or requests identification of the config script or data set for the particular class or type of the flight vehicle 26 for which a flight vehicle image 80 is to be generated in the above-noted manner (e.g., config script prompt 190 on the graphical user interface 162 of FIG. 2B). The desired config script for the selected type or class of the flight vehicle 26 for which a flight vehicle image 80 is to be generated is then input at step 128 of the protocol 94 (e.g., in data entry segment 192 on the graphical user interface 162 of FIG. 2B). Any appropriate way of addressing this functionality may be utilized. For instance, the flight vehicle image generation computer system 38 may be configured to display a default config script for the selected type or class of flight vehicle 26, a drop-down menu of all of the config scripts for the selected type or class of flight vehicles 26 stored in the flight vehicle database 46 or otherwise available to the flight vehicle image generation computer system 38 may be displayed (e.g., via drop-down menu 194 on the graphical user interface 162 of FIG. 2B) for selection in a manner known in the art (e.g., "clicking" on the desired config script), or the operator may be required to manually enter an appropriate identifier associated with the desired config script. Any way of identifying the config script for the selected type or class of the flight vehicle 26 for which a flight vehicle image 80 is to be generated may be employed by the protocol 94. In any case and as noted above, the identification of the desired config script results in the retrieval of this config script through execution of step 129 of the protocol 94 and for initializing one or more aspects of the flight vehicle image generation computer system 38 in the above-noted manner.

Another desirable feature of the flight vehicle image generation computer system 38 is that multiple flight epochs may be stored on the system 38 in relation to a particular flight of the flight vehicle 26. Step 130 of the protocol 94 prompts or requests identification of the flight epoch for a particular flight of the flight vehicle 26 and for which a flight vehicle image 80 is to be generated in the above-noted manner (e.g., flight epoch prompt 196 on the graphical user interface 162 of FIG. 2B). The flight epoch for the relevant flight of the flight vehicle 26 is then input at step 131 of the protocol 94 (e.g., in data entry segment 198 on the graphical user interface 162 of FIG. 2B). Any appropriate way of addressing this functionality may be utilized. For instance, the flight vehicle image generation computer system 38 may be configured to display a default flight epoch for the relevant flight of the flight vehicle 26, a drop-down menu of flight epochs for the relevant of the flight vehicle 26 may be displayed (e.g., via drop-down menu 200 on the graphical user interface 162 of FIG. 2B) for selection in a manner known in the art (e.g., "clicking" on the desired flight epoch), or the operator may be required to manually enter an appropriate identifier associated with the desired flight epoch. Any way of identifying the flight epoch for the relevant flight of the flight vehicle 26 may be employed by the protocol 94. In any case and as noted above, the identification of the desired flight epoch results in the retrieval of relevant data through execution of step 132 of the protocol 94 and for use by the flight vehicle image generation computer system 38 to interpret the telemetry data on the flight vehicle 26 in the above-noted manner.

The flight vehicle image 80 relating to the flight vehicle 26 will be displayed on the selected display(s) 78 through execution of step 133 of the protocol 94 of FIG. 2A. Various changes may be made in relation to the flight vehicle image generation computer system 38 at any time and including during the time in which a flight vehicle image 80 is being generated by the system 38 that relates to the flight vehicle 26. One option is to switch from one telemetry data source or processor 34 to another telemetry data source or processor 34 through execution of step 134 of the protocol 94 (using the corresponding portion of the graphical user interface 162 of FIG. 2B or a functional equivalent thereof). Generally, a prompt or request to identify a different telemetry data source 34 for providing telemetry data for generating an image 80 relating to the flight vehicle 26 may be made through execution of step 138. Step 138 may be configured/ implemented in the same manner as step 114 discussed above in relation to the initialization of the flight vehicle image generation computer system 38. The identify of the telemetry data source or processor 34 is then input at step 142 of the protocol 94. Step 142 may be configured/ implemented in the same manner as step 118 discussed above in relation to the initialization of the flight vehicle image generation computer system 38.

Another option is to make at least one change in relation to where the image 80 relating to the flight vehicle 26 is being generated or displayed. This may be done through execution of step 150 of the protocol 94 (using the corresponding portion of the graphical user interface 162 of FIG. 2B or a functional equivalent thereof). Generally, a prompt or request to identify the location where the image 80 of the flight vehicle 26 is to be generated or displayed may be made through execution of step 154 of the protocol 94. Step 154 may be configured/implemented in the same manner as step 122 discussed above in relation to the initialization of the flight vehicle image generation computer system 38. The identify of the new location or locations where the image 80 relating to the flight vehicle 26 is desired/required to be displayed or generated is then input at step 158 of the protocol 94. Step 158 may be configured/implemented in the same manner as step 126 discussed above in relation to the initialization of the flight vehicle image generation computer system 38.

Step 133 of the protocol 94 of FIG. 2A once again is directed to the generation of the flight vehicle image 80 on the selected display(s) 78 of the flight vehicle image generation computer system 38. One embodiment of a representative output on a given display 78 is presented in FIG. 2C. A number of additional features may be generated on the selected display(s) 78 of the flight vehicle image generation computer system 38. The actual trajectory 81 (based upon the telemetry data on the flight vehicle 26) of the flight vehicle image 80 may be displayed, the expected trajectory 81a may be displayed (alone or in combination with a first shadow image 80a that may be a replica of the flight vehicle image 80 or some other graphical depiction), and the expected attitude (orientation) of the flight vehicle 26 may be displayed by a second shadow image 80b (that also may be a replica of the flight vehicle image 80 or some other graphical depiction). This second shadow image 80b may be displayed at any location relative to the flight vehicle image 80.

Figure 3:
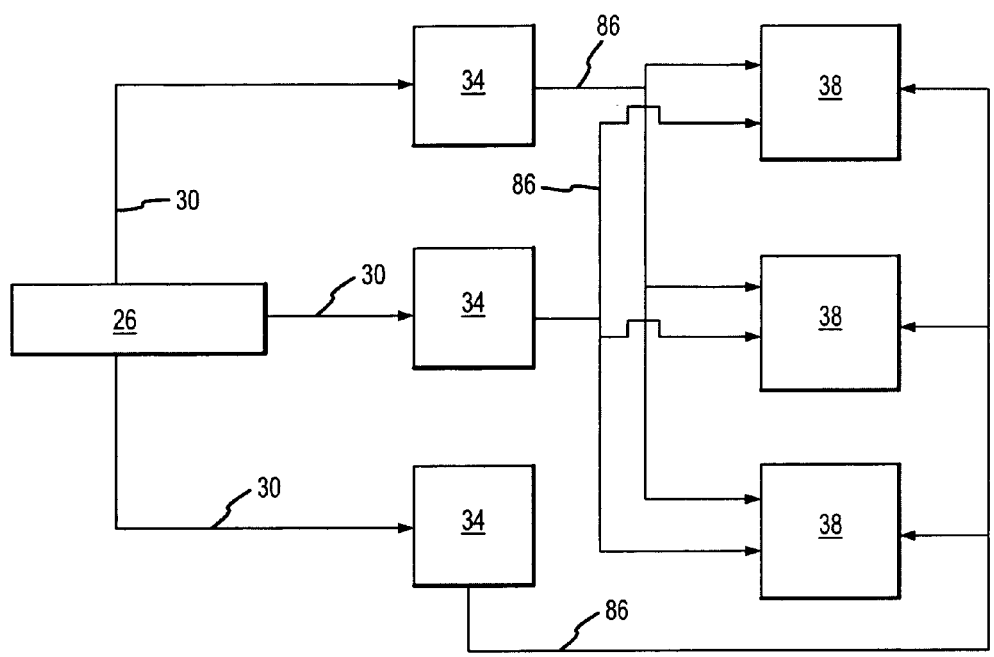
FIG. 3 is a schematic of one implementation of a plurality of flight vehicle image generation computer systems.

Multiple flight vehicle image generation computer systems 38 of the type discussed above in relation to FIGS. 1–2B also may be integrated in any appropriate manner. One way in which this may be done is illustrated in FIG. 3. In this case, the flight vehicle 26 issues a telemetry signal 30 that is received by a plurality of telemetry data sources or processors 34 (three in the illustrated embodiment, although any appropriate number may be utilized). Each of these telemetry data sources or processors 34 communicates with a plurality of flight vehicle image generation computer systems 38 of the above-described type (three in the illustrated embodiment, although any appropriate number may be utilized).

EXAMPLE I

The flight vehicle image generation computer system 38 was utilized to generate an image 80 of the flight vehicle 26 for multiple flights of the vehicle 26. Each of these flights occurred less than one year prior to the filing date of the above-noted U.S. Provisional Patent Application Ser. No. 60/338,552 and more than one year prior to the filing date of the subject patent application. However, no action was undertaken regarding the flight of the vehicle 26 in response to the generation of these images 80 by the system 38 (i.e., the images 80 were not flight critical). These images 80 were viewed by employees of the assignee of the subject patent application, as well possibly others participating in flight operations. In at least certain of these cases, derivatives of these images (transformed from a 1280×1024 VGA signal to an NTSE signal (i.e., television signal)) also were broadcast via cable television.

EXAMPLE II

Figure 4:
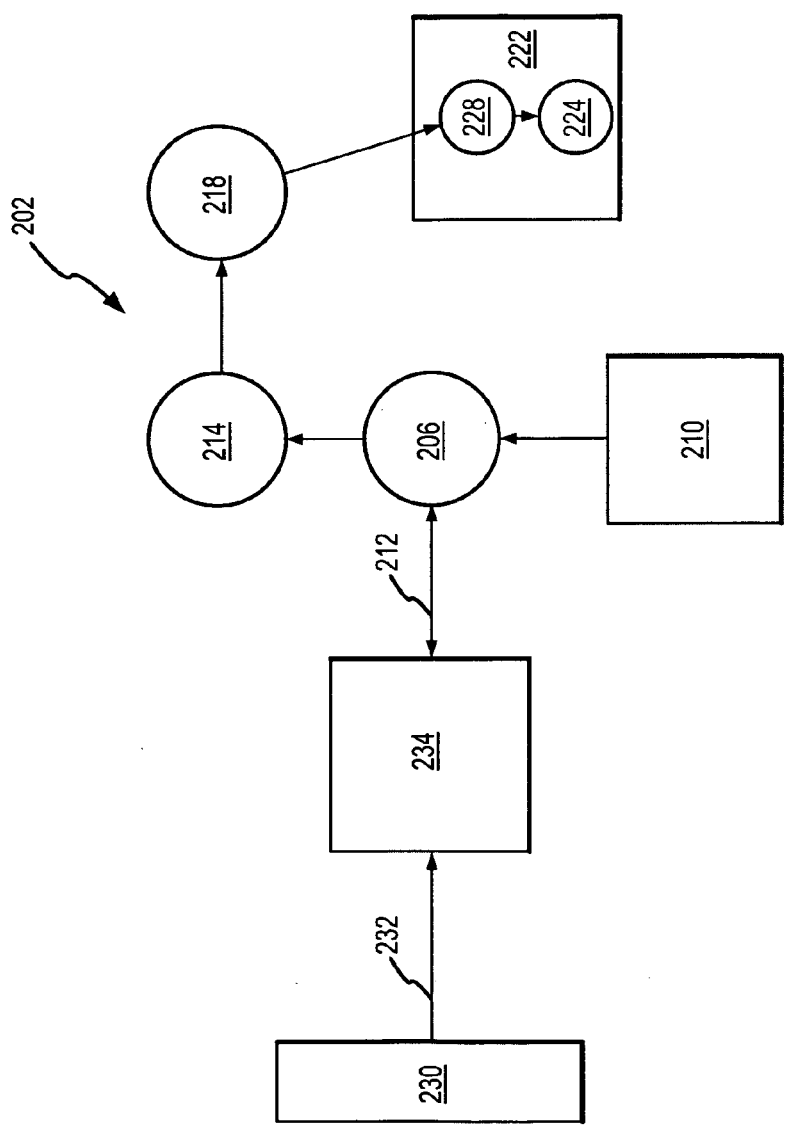
FIG. 4 is a schematic of another embodiment of a flight vehicle image generation computer system.

Another embodiment of a flight vehicle image generation computer system is illustrated in FIG. 4 and is identified by reference numeral 202. A flight vehicle 230 sends a telemetry signal 232 to a telemetry data source or processor 234. This telemetry signal 232 is provided to the flight vehicle image generation computer system 202 via a communication link 212 for generation of a 3D image on at least a substantially real-time basis. The flight vehicle image generation computer system 202 includes an interface 206, a data monitor 214, a modeling software driver 218, and a remote computer 222. The remote computer 222 in turn includes modeling software 228 and a display 224.

The flight vehicle image generation computer system 202 of FIG. 4 can only be used with a single type or class of flight vehicle 230. This single type or class of flight vehicle 230 is "hard-wired" into the system 202 and into the telemetry data source or processor 234, and thereby could not be input or modified by any type of graphical user interface. Moreover, the image of the flight vehicle 230 can be displayed at only a single location in the case of the flight vehicle image generation computer system 202 of FIG. 4 (i.e., on the display 224). This single location is also "hard-wired" into the system 202, and thereby could not be input or modified by any type of graphical user interface. Moreover, the flight vehicle image generation computer system 202 uses a predetermined, single telemetry data source or processor 234. This single location is "hard-wired" into the system 202, and thereby could not be input or modified by any type of graphical user interface. The system 202 is also "hard-wired" in the sense that it utilizes a predefined (static) data packet, transmission medium, data rate, and a predefined (static) system configuration. Finally, the modeling software driver 218 is of a hard-wired configuration in that its configuration cannot be modified by a graphical user interface.

The flight vehicle image generation computer system 202 was utilized to generate an image of the flight vehicle 230 for multiple flights of the vehicle 230. Each of these flights occurred more than one year prior to the priority date of the above-noted U.S. Provisional Patent Application Ser. No. 60/338,552. However, no action was undertaken regarding the flight of the vehicle 230 in response to the generation of these images by the system 202 (i.e., the images were not flight critical). Moreover, personnel employed by the assignee of the subject patent application viewed these images, as well possibly others participating in flight operations.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for generating an image of a vehicle, comprising the steps of:
    issuing a prompt on a graphical user interface of a vehicle image generation computer system, wherein said prompt is a request for a user to identify a vehicle type to said vehicle image generation computer system, wherein a data profile for each of a plurality of different said vehicle types is in storage on said vehicle image generation computer system such that said vehicle image generation computer system comprises a plurality of said data profiles, wherein each said data profile may be retrieved from storage by said vehicle image generation computer system, and wherein all telemetry data will thereafter be acquired by said vehicle image generation computer system in accordance with said data profile that has been retrieved;
    identifying a first vehicle type to said vehicle image generation computer system, wherein said identifying step is executed by a user of said vehicle image generation computer system in response to and thereby after an execution of said issuing a prompt step;
    retrieving a first data profile from said plurality of said data profiles, wherein said first data profile is specific to said first vehicle type, and wherein said retrieving step is executed by said vehicle image generation computer system in response to and thereby after an execution of said identifying step;
    invoking a request to a first telemetry processor for telemetry data on a first vehicle corresponding with said first vehicle type, wherein said invoking a request step is in accordance with said first data profile from said retrieving step, and wherein all telemetry data on said first vehicle is provided to said vehicle image generation computer system only after execution of said retrieving step;
    transmitting telemetry data on said first vehicle from said first vehicle to said first telemetry processor;
    providing said telemetry data from said first telemetry processor to said vehicle image generation computer system in accordance with said first data profile from said retrieving step; and
    generating an image on said vehicle image generation computer system, wherein said image corresponds with said first vehicle, is based upon a CAD file associated with said first vehicle type, and further is based upon said telemetry data from said providing step, wherein said image is manipulated by said telemetry data displaying said image.

2. A method, as claimed in claim 1, wherein:
    said prompting step comprises displaying a list of a plurality of vehicle types stored on said vehicle image generation computer system.

3. A method, as claimed in claim 1, wherein:
    said identifying step comprises selecting said first vehicle type from a drop-down menu listing a plurality of vehicle types.

4. A method, as claimed in claim 1, wherein:
    said first data profile from said retrieving step comprises at least one characteristic of data that is relevant to said first vehicle type in relation to said vehicle image generation computer system being able to execute said generating step.

5. A method, as claimed in claim 1, wherein:
    said generating step comprises graphically depicting a current behavior of an operation of said first vehicle.

6. A method, as claimed in claim 1, wherein:
    said providing step comprises said vehicle image generation computer system utilizing a client/server architecture.

7. A method, as claimed in claim 6, wherein:
    a first server within said client/server architecture is specific to said first telemetry processor, a second server within said client/server architecture is specific to a second telemetry processor different from said first telemetry processor, and a first client within said client/server architecture is operatively interconnected with each of said first and second servers.

8. A method, as claimed in claim 1, wherein:
    said providing step comprises a client of said vehicle image generation computer system requesting said telemetry data from a first server of said vehicle image generation computer system and associated with said first telemetry processor, wherein said first server provides an interface between said client and said first telemetry processor to allow said client to communicate with said first telemetry processor.

9. A method, as claimed in claim 1, wherein:
    said providing step comprises said vehicle image generation computer system providing an option to acquire said telemetry data from multiple telemetry processors.

10. A method, as claimed in claim 1, wherein:
    said providing step comprises switching from said first telemetry processor to a second telemetry processor.

11. A method, as claimed in claim 1, further comprising the steps of:
    switching from said first telemetry processor to a second telemetry processor;
    invoking a request to said second telemetry processor for telemetry data on said first vehicle corresponding with said first vehicle type, wherein said invoking a request step in relation to said second telemetry processor is in accordance with said first data profile from said retrieving step;
    transmitting telemetry data on said first vehicle from said first vehicle to said second telemetry processor; and
    providing said telemetry data from said second telemetry processor to said vehicle image generation computer system.

12. A method, as claimed in claim 1, wherein:
    said generating step comprises generating said image on both first and second displays of said vehicle image generation computer system.

13. A method, as claimed in claim 1, further comprising step of:
    providing an option on said vehicle image generation computer system to select at least one location for execution of said generating step.

14. A method, as claimed in claim 1, further comprising step of:
    providing an option on said vehicle image generation computer system to select multiple locations for execution of said generating step.

15. A method, as claimed in claim 1, wherein:
said generating step comprises generating a real time image of said first vehicle on said vehicle image generation computer system.

16. A method, as claimed in claim 1, wherein said image is three-dimensional and wherein generating step comprises manipulating said three-dimensional image based upon said telemetry data from said providing step to illustrate a behavior of said first vehicle.

17. A method for generating an image of a vehicle, comprising the steps of:
issuing a prompt on a graphical user interface of a vehicle image generation computer system, wherein said prompt is a request for a user to identify a vehicle type to said vehicle image generation computer system, wherein a data profile for each of a plurality of different said vehicle types is in storage on said vehicle image generation computer system such that said vehicle image generation computer system comprises a plurality of said data profiles, wherein each said data profile may be retrieved from storage by said vehicle image generation computer system, and wherein all telemetry data will thereafter be acquired by said vehicle image generation computer system in accordance with said data profile that has been retrieved;
identifying a first vehicle type to said vehicle image generation computer system, wherein said identifying step is executed by a user of said vehicle image generation computer system in response to and thereby after an execution of said issuing a prompt step;
retrieving a first data profile from said plurality of said data profiles, wherein said first data profile is specific to said first vehicle type, and wherein said retrieving step is executed by said vehicle image generation computer system in response to and thereby after an execution of said identifying step;
invoking a request to a first telemetry processor for telemetry data on a first vehicle corresponding with said first vehicle type, wherein said invoking a request step is in accordance with said first data profile from said retrieving step, and wherein all telemetry data on said first vehicle is provided to said vehicle image generation computer system only after execution of said retrieving step;
transmitting telemetry data on said first vehicle from said first vehicle to said first telemetry processor;
providing said telemetry data from said first telemetry processor to said vehicle image generation computer system in accordance with said first data profile from said retrieving step; and
generating a three-dimensional image on said vehicle image generation computer system, wherein said three-dimensional image corresponds with said first vehicle and is a manipulation of said three-dimensional image based upon said telemetry data from said providing step displaying said three-dimensional image.

18. A method, as claimed in claim 17, wherein:
said prompting step comprises displaying a list of a plurality of vehicle types stored on said vehicle image generation computer system.

19. A method, as claimed in claim 17, wherein:
said identifying step comprises selecting said first vehicle type from a drop-down menu listing a plurality of vehicle types.

20. A method, as claimed in claim 17, wherein:
said first data profile from said retrieving step comprises at least one characteristic of data that is relevant to said first vehicle type in relation to said vehicle image generation computer system being able to execute said generating step.

21. A method, as claimed in claim 17, wherein:
said generating step comprises graphically depicting a current behavior of an operation of said first vehicle.

22. A method, as claimed in claim 17, wherein:
said providing step comprises said vehicle image generation computer system utilizing a client/server architecture.

23. A method, as claimed in claim 22, wherein:
a first server within said client/server architecture is specific to said first telemetry processor, a second server within said client/server architecture is specific to a second telemetry processor different from said first telemetry processor, and a first client within said client/server architecture is operatively interconnected with each of said first and second servers.

24. A method, as claimed in claim 17, wherein:
said providing step comprises a client of said vehicle image generation computer system requesting said telemetry data from a first server of said vehicle image generation computer system and associated with said first telemetry processor, wherein said first server provides an interface between said client and said first telemetry processor to allow said client to communicate with said first telemetry processor.

25. A method, as claimed in claim 17, wherein:
said providing step comprises said vehicle image generation computer system providing an option to acquire said telemetry data from multiple telemetry processors.

26. A method, as claimed in claim 17, wherein:
said providing step comprises switching from said first telemetry processor to a second telemetry processor.

27. A method, as claimed in claim 17, further comprising the steps of:
switching from said first telemetry processor to a second telemetry processor;
invoking a request to said second telemetry processor for telemetry data on said first vehicle corresponding with said first vehicle type, wherein said invoking a request step in relation to said second telemetry processor is in accordance with said first data profile from said retrieving step;
transmitting telemetry data on said first vehicle from said first vehicle to said second telemetry processor; and
providing said telemetry data from said second telemetry processor to said vehicle image generation computer system.

28. A method, as claimed in claim 17, wherein:
said generating step comprises generating said image on both first and second displays of said vehicle image generation computer system.

29. A method, as claimed in claim 17, further comprising step of:
providing an option on said vehicle image generation computer system to select at least one location for execution of said generating step.

30. A method, as claimed in claim 17, further comprising step of:
providing an option on said vehicle image generation computer system to select multiple locations for execution of said generating step.

31. A method, as claimed in claim 17, wherein:
said generating step comprises generating a real time image of said first vehicle on said vehicle image generation computer system.

32. A method, as claimed in claim 17, wherein said three-dimensional image is generated from a CAD file and as manipulated by said telemetry data from said providing step.

* * * * *